Patented Mar. 14, 1939

2,150,692

UNITED STATES PATENT OFFICE 2,150,692

DYE COMPOSITION AND ART OF COLORING THEREWITH

James G. McNally and John A. Leermakers, Rochester, N. Y., assignors to Eastman Kodak Company, Rochester, N. Y., a corporation of New Jersey No Drawing. Application September 16, 1937, Serial No. 164,188

16 Claims. (Cl. 8—58)

This invention relates to stable finely divided suspensions or dispersions of dyes insoluble or difficultly soluble in water. More particularly it relates to dispersions of such dyes which are suitable for the dyeing, printing, stenciling or otherwise coloring of materials made of or containing an organic derivative of cellulose. The invention includes stable dye compositions comprising an insoluble dye having affinity for organic derivatives of cellulose and a water soluble cellulose acetate dispersing agent and a process for dyeing or coloring material made of or containing an organic derivative of cellulose.

Typical organic derivatives of cellulose, for which the stable dye compositions of our invention find application, include the hydrolyzed as well as the unhydrolyzed cellulose organic acid esters of cellulose, such as cellulose acetate, cellulose propionate or cellulose butyrate and the hydrolyzed as well as the unhydrolyzed mixed organic acid esters of cellulose such as cellulose acetate proprionate, cellulose acetate butyrate and cellulose ethers, such as methyl cellulose, ethyl cellulose or benzyl cellulose.

Dyes may be classified broadly as being soluble or insoluble in water. In general, it may be stated that soluble dyes are applied directly from aqueous solution to the material undergoing dyeing, without the necessity of agents promoting solubility, whereas insoluble dyes require agents to enable them to effect coloration. Various substances have been developed for this purpose. These substances commonly known as dispersing or solubilizing agents, as their name implies, disperse or solubilize, or both disperse and solubilize, the dye in the aqueous dye-bath thus enabling it to effect coloration. Our invention is directed to this art.

In some instances, a dye may possess such solubility that it becomes difficult to classify it as insoluble or difficultly soluble but yet it may be of such insufficient solubility that the use of a dispersing or solubilizing agent is desirable. The expression "insoluble dye" as used in the claims is intended to include not only dyes which are insoluble in water but also dyes of the character just mentioned which are of such insufficient or difficult solubility in water that the use of a dispersing or solubilizing agent is desirable.

It is an object of our invention to provide improved stable dye compositions. A further object is to prevent or retard the separation of dyes from pastes, suspensions or dispersions of the same. A still further object is to provide a process of dyeing, printing, stenciling or otherwise coloring materials made of or containing organic derivatives of cellulose.

We have discovered that water soluble cellulose acetates are excellent dispersing agents for producing water solubilized forms of insoluble dyes having an affinity for organic derivatives of cellulose. Advantageously, the water soluble cellulose acetates employed in the dye compositions and the process of our invention have an acetyl content ranging from 13 to 20% (by weight).

The water soluble cellulose acetate dispersing agents of our invention are insensible to acid and do not precipitate from an aqueous solution when large amounts of neutral salts are added. This latter property is of considerable value since frequently when cellulose acetate silk is being dyed, a neutral salt such as sodium chloride is added to promote exhaustion of the dyebath. The property of being insensible to acids is of particular value when it is desired to dye union goods from acid or salt baths containing a silk, wool or cotton dye in addition to a cellulose acetate dye.

The water soluble cellulose acetate dispersing agents of our invention may be employed to solubilize or disperse all types of insoluble dyes having an affinity for organic derivatives of cellulose such as cellulose acetate silk for example. To illustrate, anthraquinone and azo dyes are equally well solubilized or dispersed. While the azo dyes ordinarily employed to dye organic derivatives of cellulose are of the monoazo type containing an aryl nucleus of the benzene series on both sides of the azo bond, azo dyes wherein a heterocyclic or hydroaromatic nucleus is present, for example, may similarly be employed.

The expression "an insoluble dye having affinity for organic derivatives of cellulose" refers to water insoluble dyes capable of dyeing organic derivatives of cellulose from an aqueous suspension. Many such dyes are known in the art to which this invention is directed. The invention does not therefore apply to vat dyes since, practically speaking, while these dyes are ordinarily insoluble in water, they cannot be applied to color an organic derivative of cellulose from an aqueous suspension.

The dispersing agents of our invention may be employed in conjunction with other dispersing agents (soap, Turkey red oil and sulfonated olive oil, for example) in preparing the dye pastes or powders. Similarly, the dye pastes or powders prepared employing the dispersing agents of our invention may be added to aqueous solutions of other dispersing agents such as soaps, salts of sulfonic acids and sulfonated olive oil, for example.

In some cases, after standing in dry atmosphere, powders, particularly those which have been prepared from pastes of dye and dispersing agent do not easily disperse in water although they dissolve readily in soap solutions. The difficulty just noted may be avoided, however, by the addition of small quantities of hygroscopic materials such as glycerin or acetamide which prevent complete dessication of the powder. Conveniently, the hygroscopic material can be added to the dye paste from which the powder is to be formed. Powders obtained from such pastes appear dry and run freely and readily disperse themselves in water. The hygroscopic agent may likewise be added in proper amount to the dye and anhydrous powdered dispersing agent and the mixture ground to powder but this latter method is not considered as desirable as the former.

We have also found that certain selected solid materials such as sodium sulfate, sodium chloride, sugar and urea can be added to the pastes of dye and dispersing agent either with or without conditioning agents, and that these diluents do not affect the efficiency of the dispersing agent. These diluents may also be added to a dried paste of dye and dispersing agent and the whole ground together to a powder of the desired fineness.

Our invention will now be illustrated in connection with the preparation of the new dye dispersions or suspensions together with their application in the dyeing of organic derivatives of cellulose particularly cellulose acetate silk. The material undergoing dyeing or coloration with the dye pastes or powders of our invention can be in the form of yarn, knit goods or woven goods, for example. The forms, just mentioned, which the material to be colored can have, are illustrative and are not intended to limit our invention.

*Example 1.—To dye cellulose acetate silk blue with a water insoluble anthraquinone dye*

50 gm. of a water soluble cellulose acetate containing between 13 and 20% combined acetyl are dissolved in 500 cc. of water and the resulting solution is mixed with 250 gm. of 1-methylamino-4-methylamino-anthraquinone. The mixture resulting is thoroughly ground together to a homogeneous paste.

One-half of the paste prepared above is added to 150 liters of water at 85° C. and 5 kilograms of cellulose acetate silk goods are entered and worked at this temperature for one hour. The material is then removed from the dyebath, washed and rinsed. The cloth is dyed a brilliant sky blue.

The remaining half of the paste prepared above is allowed to dry and then is finely pulverized. The powder resulting from the pulverizing treatment is added to 5 liters of a 6% soap solution and the whole is then diluted to 150 liters with water at 75° C. 5 kilograms of cellulose acetate silk yarn are entered and worked at 75° C. for two hours. The yarn is then removed, washed and rinsed and is dyed a bright sky blue.

*Example 2.—To dye cellulose acetate silk red with a water insoluble dye*

10 gm. of a water soluble cellulose acetate and 5 gm. of glycerin are dissolved in 100 cc. of water. 50 gm. of

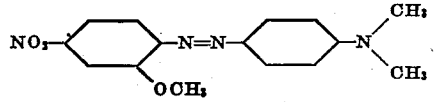

are added to the solution and the mixture resulting is thoroughly mixed and ground to a homogeneous paste. The paste thus formed is allowed to dry following which it is mixed with an equal weight of anhydrous sodium sulfate. The mixture thereby resulting is then finely pulverized and a free running powder is obtained. This powder is added to 2 liters of a 6% soap solution and the mixture resulting is then diluted to 60 liters with water at 75° C. 2 kilograms of cellulose acetate silk goods are entered and worked at 75° C. for two hours. The cloth is then removed, washed and rinsed, and is dyed a deep red color.

*Example 3.—To dye cellulose acetate silk a yellow shade with a hydroaromatic azo dye*

20 grams of a water soluble cellulose acetate and 100 grams of cane sugar are dissolved in 200 cc. of water and 100 grams of 1-methoxy-4-nitrobenzeneazo-5,5-dimethyl-1,3-cyclohexadione are added to the solution. The resulting mixture is thoroughly ground to a paste, allowed to dry, and then finely pulverized.

The powder formed above is added to 75 liters of water at 85° C. and 10 kilograms of cellulose acetate silk fabric are entered and worked for one hour. The goods are removed, washed and rinsed. The cellulose acetate silk fabric is dyed a bright green-yellow shade.

*Example 4.—To dye cellulose acetate silk yellow with a heterocyclic azo compound*

A dye paste prepared by grinding 20 grams of a water soluble cellulose acetate containing 13–20% of combined acetyl and 100 grams of p-nitrobenzeneazophenylmethyl pyrazolone in 200 cc. of water is added to 100 liters of water at 85° C. 5 kilograms of cellulose acetate silk goods are entered and worked at this temperature for one hour. Upon removal and washing and rinsing, the goods are found to be dyed a bright yellow.

*Example 5.—To dye cellulose acetate silk-viscose crepe goods a bright orange yellow*

50 grams of a water soluble cellulose acetate containing between 13 and 20% combined acetyl are dissolved in 500 cc. of water. 150 grams of 1-methoxy-4-nitrobenzeneazodiphenylamine are added and the resulting mixture is thoroughly ground together to a homogeneous paste. This paste is allowed to dry and is then finely pulverized. The self-dispersing dye powder thus formed is added to 150 liters of water and 100 grams of Benzopurpurine 4B (Color Index 448) and 15 kilograms of Glauber's salt are added to the dye bath and the temperature is raised to 85° C.

10 kilograms of cellulose acetate silk-viscose crepe goods are entered in the dye bath thus prepared and worked for two hours at 85° C. following which they are removed and subjected to a washing and rinsing treatment. The material is dyed a bright orange-red.

*Example 6.—To dye union goods composed of cellulose acetate silk and silk a bright red*

A self-dispersing powder made up of 20 grams of water soluble cellulose acetate and 100 grams of 1-methoxy-4-nitrobenzeneazodiphenylamine is added to 100 liters of water containing 5 kilograms of glacial acetic acid, 10 kilograms of Glauber's salt and 50 grams of Eosin (Color Index 881). The temperature of the dyebath thus prepared is raised to 85° C. and 5 kilograms of the union goods composed of cellulose acetate silk and silk are entered and worked for about two hours. The material is then removed, washed and rinsed and is found to be dyed a bright red color.

*Example 7.—To dye cellulose acetate silk blue with an anthraquinone dye*

100 grams of 1-methylamino-4-methylaminoanthraquinone are ground dry with 50 grams of a water soluble cellulose acetate in dry powdered form. The finely pulverized dye composition resulting can be used to dye cellulose acetate silk a bright sky blue color from an aqueous bath or from an aqueous soap bath in the usual manner.

We have further found that water soluble cellulose acetates constitute advantageous additions to printing pastes which are not so alkaline as to effect hydrolysis of the ester. The ester acts as a thickening agent in pastes containing both soluble and insoluble dyes. Further, the ester serves the purpose of dispersing those dyes which are not water soluble thereby permitting a high degree of dispersion to be achieved and forming pastes which can be used to produce fast even prints.

Cellulose acetate silk, for example, can be printed in fast even shades with the printing pastes of our invention. By proper selection of the dye compounds mixed textile materials made of organic derivatives of cellulose and other natural or synthetic textile fibers may be printed. The constitution of the dye paste will of course depend upon the nature of the fabric to be printed and of the dye or dye compounds to be employed.

The following example will illustrate the employment of water soluble cellulose acetates in a printing paste.

*Example 8.—To print cellulose acetate silk a yellow color*

A printing paste is made containing:

| | Grams |
|---|---|
| Water | 100 |
| Methyl cellosolve | 30 |
| o-Ethoxybenzeneazobarbituric acid | 10 |
| A water soluble cellulose acetate | 10 |

Cellulose acetate taffeta is printed with the above paste, dried and steamed for twenty minutes. Following this treatment, it is then washed with a ¼% soap solution at 50 C., rinsed and dried. The cellulose acetate taffeta material will be found to be printed a yellow color of excellent fastness to light.

While the process of our invention has been described in connection with the coloration of cellulose acetate silk it will be clearly understood that other organic derivatives of cellulose can be similarly colored and that the process of our invention is not limited to the coloration of cellulose acetate silk.

We claim:

1. A stable dye composition comprising an insoluble dye having affinity for organic derivatives of cellulose and as a dispersing agent therefor a water soluble cellulose acetate.

2. A stable dye composition comprising an insoluble dye having affinity for organic derivatives of cellulose and as a dispersing agent therefor a water soluble cellulose acetate containing about 13–20% of combined acetyl.

3. A stable dye composition comprising an intimate, finely divided intermixture of an insoluble dye having affinity for organic derivatives of cellulose and as a dispersing agent therefor a water soluble cellulose acetate.

4. A stable dye composition comprising an intimate, finely divided intermixture of an insoluble dye having affinity for organic derivatives of cellulose and as a dispersing agent therefor a water soluble cellulose acetate containing about 13–20% of combined acetyl.

5. A stable dye composition comprising an intimate, finely divided intermixture of an insoluble dye having affinity for cellulose acetate and as a dispersing agent therefor a water soluble cellulose acetate containing about 13–20% of combined acetyl.

6. A stable dye composition comprising a finely divided intermixture of an insoluble azo dye having affinity for organic derivatives of cellulose and as a dispersing agent therefor a water soluble cellulose acetate.

7. A stable dye composition comprising a finely divided intermixture of an insoluble azo dye having affinity for organic derivatives of cellulose and as a dispersing agent therefor a water soluble cellulose acetate containing about 13–20% of combined acetyl.

8. A stable dye composition comprising an intimate, finely divided intermixture of an insoluble azo dye having affinity for cellulose acetate and as a dispersing agent therefor a water soluble cellulose acetate.

9. A stable dye composition comprising a finely divided intermixture of an insoluble anthraquinone dye having affinity for organic derivatives of cellulose and as a dispersing agent therefor a water soluble cellulose acetate.

10. A stable dye composition comprising a finely divided intermixture of an insoluble anthraquinone dye having affinity for organic derivatives of cellulose and as a dispersing agent therefor a water soluble cellulose acetate containing about 13–20% of combined acetyl.

11. A stable dye composition comprising an intimate finely divided intermixture of an insoluble anthraquinone dye having affinity for cellulose acetate and as a dispersing agent therefor a water soluble cellulose acetate.

12. The process for the coloration of an organic derivative of cellulose which comprises treating an organic derivative of cellulose with a stable dye composition comprising an insoluble dye having affinity for organic derivatives of cellulose and as a dispersing agent therefor a water soluble cellulose acetate.

13. The process for the coloration of an organic derivative of cellulose which comprises treating an organic derivative of cellulose with a stable dye composition comprising a finely divided intermixture of an insoluble dye having affinity for organic derivatives of cellulose and as a dispersing agent therefor a water soluble cellulose acetate.

14. The process for the coloration of a cellulose acetate which comprises treating a cellulose acetate with a stable dye composition comprising an insoluble dye having affinity for cellulose acetate and as a dispersing agent therefor a water soluble cellulose acetate.

15. The process for the coloration of a cellulose acetate which comprises treating a cellulose acetate with a stable dye composition comprising an intimate, finely divided intermixture of an azo dye having affinity for cellulose acetate and as a dispersing agent therefor a water soluble cellulose acetate.

16. The process for the coloration of a cellulose acetate which comprises treating a cellulose acetate with a stable dye composition comprising an intimate, finely divided intermixture of an anthraquinone dye having affinity for cellulose acetate and as a dispersing agent therefor a water soluble cellulose acetate.

JAMES G. McNALLY.
JOHN A. LEERMAKERS.